United States Patent
Hu et al.

(10) Patent No.: US 12,212,589 B1
(45) Date of Patent: Jan. 28, 2025

(54) SECURE LOCALIZATION METHOD FOR MULTI-MOBILE ROBOTS BASED ON NETWORK COMMUNICATION

(71) Applicant: Harbin University of Science and Technology, Harbin (CN)

(72) Inventors: Jun Hu, Harbin (CN); Bingxin Lei, Harbin (CN); Hui Yu, Harbin (CN); Hongxu Zhang, Harbin (CN); Chaoqing Jia, Harbin (CN); Zhihui Wu, Harbin (CN)

(73) Assignee: Harbin University of Science and Technology, Harbin (CN)

( * ) Notice: Subject to any disclaimer, the term of this patent is extended or adjusted under 35 U.S.C. 154(b) by 0 days.

(21) Appl. No.: 18/824,956

(22) Filed: Sep. 5, 2024

(30) Foreign Application Priority Data

Nov. 6, 2023 (CN) .......................... 202311467947.9

(51) Int. Cl.
*H04L 9/40* (2022.01)
*H04W 4/029* (2018.01)
(Continued)

(52) U.S. Cl.
CPC ......... *H04L 63/1416* (2013.01); *H04W 4/029* (2018.02); *H04W 12/122* (2021.01); *H04W 12/63* (2021.01)

(58) Field of Classification Search
CPC .............. H04L 63/1416; H04W 4/029; H04W 12/122; H04W 12/63
(Continued)

(56) References Cited

U.S. PATENT DOCUMENTS

| | | | |
|---|---|---|---|
| 2015/0096026 A1* | 4/2015 | Kolacinski | G06N 7/01 726/23 |
| 2019/0147438 A1* | 5/2019 | Micali | G06Q 20/4016 705/71 |

(Continued)

*Primary Examiner* — Badri Narayanan Champakesan
(74) *Attorney, Agent, or Firm* — Bayramoglu Law Offices LLC (57) ABSTRACT

A secure localization method for multi-mobile robots system based on network communication includes: Step 1, establishing a nonlinear dynamic model of a multi-mobile robots system based on network communication; Step 2, designing a secure estimator for the nonlinear dynamic model; Step 3, calculating an upper bound on a one-step prediction error covariance matrix $\Sigma_{i,k+1|k}$ for each mobile robot in the network communication; Step 4, based on $\Sigma_{i,k+1|k}$, calculating an estimator gain matrix $K_{i,k+1}$ for each mobile robot in the network communication; Step 5, substituting the estimator gain matrix $K_{i,k+1}$ calculated in Step 4 into Step 2 to obtain a state estimation $\hat{x}_{i,k+1|k+1}$ at time k+1; determining whether k+1 reaches a total duration M, that is, if k+1<M, performing Step 6, and if k+1=M, ending; and Step 6, based on $K_{i,k+1}$, calculating an upper bound on an estimation error covariance matrix $\Sigma_{i,k+1|k+1}$ of each mobile robot; let k=k+1, and performing Step 2 until k+1=M is satisfied.

4 Claims, 9 Drawing Sheets

(51) Int. Cl.
*H04W 12/122* (2021.01)
*H04W 12/63* (2021.01)

(58) Field of Classification Search
USPC .......................................................... 726/23
See application file for complete search history.

(56) References Cited

U.S. PATENT DOCUMENTS

| | | | |
|---|---|---|---|
| 2020/0304314 A1* | 9/2020 | Micali | H04L 9/3239 |
| 2020/0396059 A1* | 12/2020 | Micali | H04L 63/123 |
| 2021/0243224 A1* | 8/2021 | Mahmoud | G06F 17/18 |
| 2022/0303285 A1* | 9/2022 | Sapountzis | H04L 63/1408 |
| 2023/0291753 A1* | 9/2023 | Hamdan | H04L 63/1458 |
| 2024/0046075 A1* | 2/2024 | Chen | G06N 3/084 |
| 2024/0095526 A1* | 3/2024 | Chen | G06N 3/0464 |

* cited by examiner

SECURE LOCALIZATION METHOD FOR MULTI-MOBILE ROBOTS BASED ON NETWORK COMMUNICATION

CROSS REFERENCE TO THE RELATED APPLICATIONS

This application is based upon and claims priority to Chinese Patent Application No. 202311467947.9, filed on Nov. 6, 2023, the entire contents of which are incorporated herein by reference.

TECHNICAL FIELD

The present invention relates to the secure localization method for multi-mobile robots, and more particularly relates to the secure localization method for multi-mobile robots based on network communication.

BACKGROUND

With the development and maturity of mobile robot technology, the application and demand for robot are increasing day by day. At present, mobile robots are widely used in the fields of localization, path planning, motion control and map construction, etc. In particular, the multi-mobile robots localization problem, i.e., the estimation problem of the position information and direction information of the mobile robots, has received particular research attention.

Due to limited equipment and unstable communication environment in networked system, the transmitted measurement in shared network communication may suffer from the random sensor one-step delay as well as malicious network attacks. Therefore, the security problem of information transmission has received increasing research attention in the network communication.

In addition, the instability of the networked environment can lead to the randomness of the coupling strength between nodes in practical applications. Compared with the study assuming that the coupling strength is the deterministic value, the study of random coupling strength is more general. Therefore, in the multi-mobile robots system, considering the random coupling strength is of practical significance due to the mutual influence of motion between robots.

The currently available estimation methods cannot simultaneously handle the state estimation problem with random coupling strength and random sensor one-step delay under deception attack, which results in the low accuracy of estimation algorithm performance. Therefore, it is of practical significance to propose the state estimation method that are simultaneously applicable to these networked induced phenomena.

SUMMARY

In order to solve the problem of low estimation accuracy caused by the inability of existing estimation methods to simultaneously handle the state estimation problem of the multi-mobile robots system with random coupling strength and random sensor one-step delay under deception attack, the objective of the present invention is to provide a secure localization method for multi-mobile robots based on network communication.

The present invention adopts the following technical solution.

A secure localization method for multi-mobile robots based on network communication includes the following steps:

Step 1: establishing a nonlinear dynamic model of a multi-mobile robots system based on network communication;

Step 2: designing a secure estimator for the nonlinear dynamic model of the multi-mobile robots system established in Step 1;

Step 3: calculating an upper bound on a one-step prediction error covariance matrix $\Sigma_{i,k+1|k}$ for each mobile robot in the network communication;

Step 4: based on the upper bound on the one-step prediction error covariance matrix $\Sigma_{i,k+1|k}$ obtained in Step 3, calculating an estimator gain matrix $K_{i,k+1}$ for each mobile robot in the network communication;

Step 5: substituting the estimator gain matrix $K_{i,k+1}$ calculated in Step 4 into Step 2 to obtain a state estimation $\hat{x}_{i,k+1|k+1}$ at time k+1; determining whether k+1 reaches a total duration M, if k+1<M, performing Step 6, and if k+1=M, ending;

Step 6: based on the estimator gain matrix $K_{i,k+1}$ of each mobile robot calculated in Step 4, calculating an upper bound on an estimation error covariance matrix $\Sigma_{i,k+1|k+1}$ of each mobile robot; let k=k+1, and performing Step 2 until k+1=M is satisfied.

Compared with the prior art, the present invention has the following advantages.

The invention simultaneously considers the effects of random coupling strength and random sensor one-step delay on the estimation performance of the state of mobile robot under deception attack. The locally optimal upper bound on the estimation error covariance is obtained based on the Riccati difference equation method, which has a recursive form.

The present invention presents a recursive estimation method to estimate the state of the multi-mobile robots, which does not require multiple calls to previous data and does not require storing a complete dataset. In addition, the state estimation problem can be divided into centralized state estimation and distributed state estimation. It is worth noting that the state estimation of all nodes is expressed in a compact form and the estimator gain matrices of all nodes are obtained simultaneously in centralized state estimation. Therefore, the higher computational cost is required in the case of a large number of nodes. The present invention provides recursive distributed state estimation method, which is more suitable for online implementation.

The present invention solves the state estimation problem of the multi-mobile robots system with random coupling strength and random sensor one-step delay under deception attack that cannot be handled simultaneously by the existing state estimation methods, thus improving the accuracy of the estimation performance for such estimation problem. As can be seen from the simulation figures, the mean square error increases as the attack probability $\bar{\beta}_{i,k}$ increases. Furthermore, the average mean square error of the four mobile robots decreases by about 36% when the attack probability is changed from 0.9 to 0.5, and the average mean square error of the four mobile robots decreases by about 10% when the attack probability is changed from 0.5 to 0.1, which further validates the feasibility and effectiveness of the proposed state estimation method in the present invention.

DETAILED DESCRIPTION OF THE EMBODIMENTS

The embodiment of the present invention is further described in detail hereinafter in conjunction with the figures.

Figure 1:
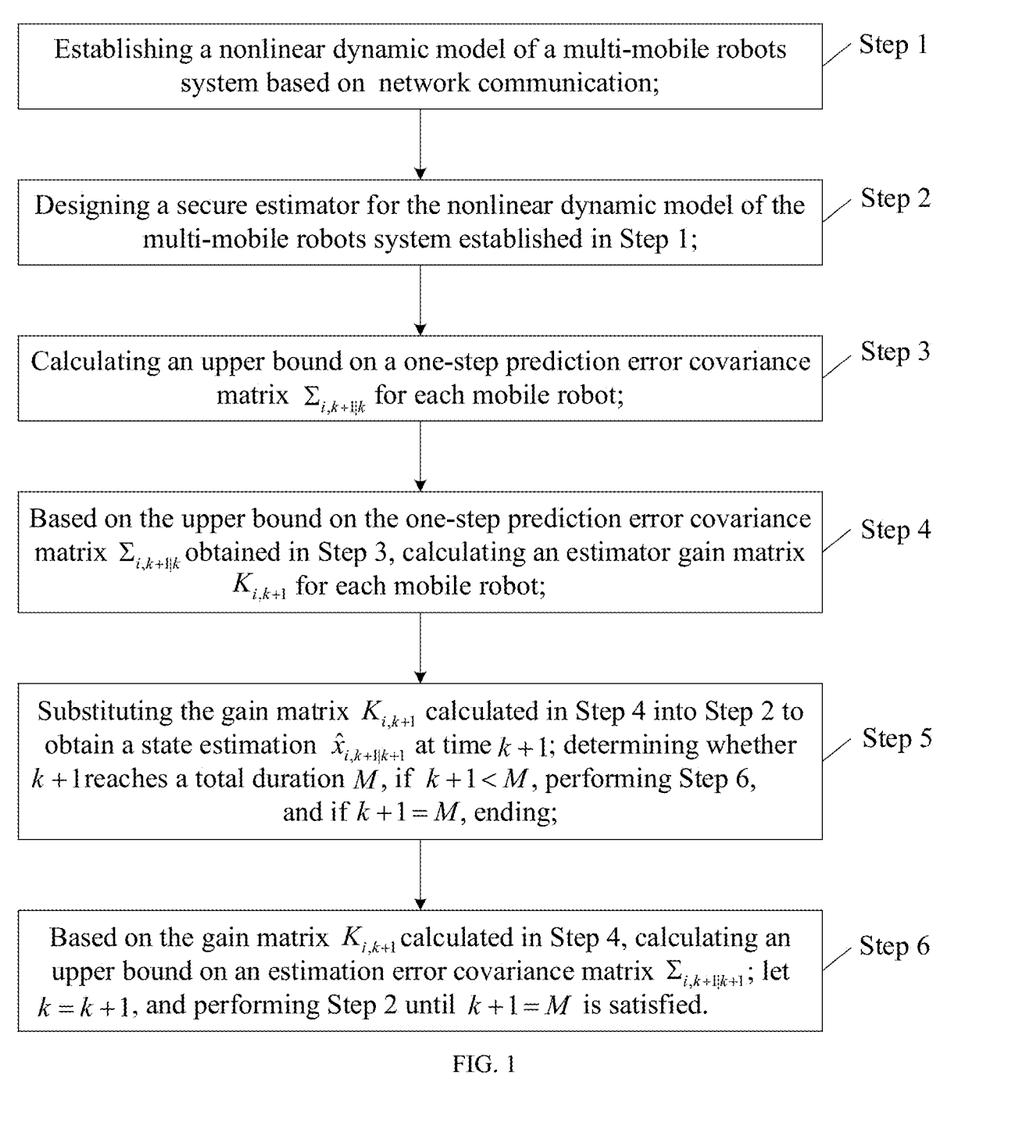
FIG. 1 shows a diagram of the secure localization method for multi-mobile robots proposed in the present invention.

The present invention provides a secure localization method for multi-mobile robots based on network communication, as shown in FIG. 1, the present invention includes the following detailed steps:

Step 1: establishing a nonlinear dynamic model of a multi-mobile robots system based on network communication; wherein Step 1a: developing the following nonlinear dynamic model of the multi-mobile robots system:

$$\vec{x}_{i,k+1} = \vec{x}_{i,k} + \begin{bmatrix} \delta_{i,k}\cos(\theta_{i,k}) \\ \delta_{i,k}\sin(\theta_{i,k}) \\ \varsigma_{i,k} \end{bmatrix} + \sum_{j=1}^{N} \alpha_{ij,k} \begin{bmatrix} 0.01 & 0 & 0 \\ 0 & 0.01 & 0 \\ 0 & 0 & 0.01 \end{bmatrix} \vec{x}_{j,k} + \vec{B}_{i,k} \varpi_{i,k} \quad (1)$$

$$\vec{z}_{i,k} = \begin{bmatrix} 1 & 0 & 0 \\ 0 & 1 & 0 \end{bmatrix} \vec{x}_{i,k} + \vec{v}_{i,k} \quad (2)$$

$$z_{i,k} = \lambda_{i,k}\vec{z}_{i,k} + (1 - \lambda_{i,k})\vec{z}_{i,k-1} \quad (3)$$

wherein, $\vec{x}_{i,k} = [u_{i,k} \; \eta_{i,k} \; \theta_{i,k}]^T$, a superscript "T" represents a transpose of a matrix; i is a label of a mobile robot and represents an ith mobile robot, i=1, 2, ..., N, N is a number of mobile robots; $(u_{i,k}, \eta_{i,k})$ denotes position information of the ith mobile robot at time k in Cartesian coordinates, $\theta_{i,k}$ represents direction information of the ith mobile robot at time k in Cartesian coordinates; $\vec{x}_{i,k+1} = [u_{i,k+1} \; \eta_{i,k+1} \; \theta_{i,k+1}]^T$, $(u_{i,k+1}, \eta_{i,k+1})$ denotes position information of the ith mobile robot at time k+1 in Cartesian coordinates, $\theta_{i,k+1}$ represents direction information of the ith mobile robot at time k+1 in Cartesian coordinates; $\delta_{i,k}$ and $\varsigma_{i,k}$ denote a displacement velocity and an angular velocity of the ith mobile robot at time k, respectively; sin($\Im$) and cos($\Im$) represent a sine function and a cosine function of $\Im$, respectively; $\vec{B}_{i,k}$ is a system noise density matrix at time k; "$\Sigma$" is a summation symbol; $\alpha_{ij,k}$ is a coupling strength of an ith mobile robot and a jth mobile robot at time k; the coupling term in the multi-mobile robots system means that the motion of each mobile robot is influenced by other robots; $\alpha_{ij,k}$ is a random variable on an interval $[c_{ij,k}, d_{ij,k}]$ satisfying E$\{\alpha_{ij,k}\}=\bar{\alpha}_{ij,k}$ and E$\{(\alpha_{ij,k}-\bar{\alpha}_{ij,k})^2\}\sqcap$E$\{\alpha_{ij,k}^2\}=\hat{\alpha}_{ij,k}$, with $0\leq c_{ij,k}\leq d_{ij,k}\leq 1$ being known constants; $\bar{\alpha}_{ij,k}$ and $\hat{\alpha}_{ij,k}$ are an expectation and a variance of $\alpha_{ij,k}$, respectively, E$\{\sqcup\}$ is a mathematical expectation of the random variable "$\sqcup$"; $\vec{x}_{j,k} = [u_{j,k} \; \eta_{j,k} \; \theta_{j,k}]^T$, $(u_{j,k}, \eta_{j,k})$ denotes position information of the jth mobile robot at time k in Cartesian coordinates, $\theta_{j,k}$ represents direction information of the jth mobile robot at time k in Cartesian coordinates; $\vec{z}_{j,k}$ is a measurement output of the ith mobile robot at time k in the multi-mobile robots system; $\vec{z}_{i,k-1}$ is a measurement output of the ith mobile robot at time k−1; $\varpi_{i,k}$ is process noise in the multi-mobile robots system; $\vec{v}_{i,k}$ is measurement noise in the multi-mobile robots system; $z_{i,k}$ is a measurement output of the ith mobile robot suffering from a random sensor one-step delay at time k; $\lambda_{i,k}$ is a Bernoulli distributed random variable to characterize a phenomenon of the random sensor one-step delay satisfying the following conditions:

Prob$\{\lambda_{i,k}=1\}=\bar{\lambda}_{i,k}$

Prob$\{\lambda_{i,k}=0\}=1-\bar{\lambda}_{i,k}$ wherein, $\bar{\lambda}_{i,k}\in(0,1]$ is an occurrence probability of the ith mobile robot suffering from the random sensor one-step delay at time k; Prob$\{\sqcup\}$ is a probability of event "$\sqcup$";

Step 1b: when data is transmitted in an opening-up and sharing network communication, a deception attack affects a measurement signal, wherein an actual measurement received by an estimator is represented as follows:

$$y_{i,k}=z_{i,k}+\beta_{i,k}\tilde{n}_{i,k} \quad (4)$$

wherein, $y_{i,k}$ is an actual measurement output of the ith mobile robot at time k; $\tilde{n}_{i,k}=-z_{i,k}+\zeta_{i,k}$ represents a deception signal, $\zeta_{i,k}$ is a bounded attack signal satisfying a condition $\zeta_{i,k}^T\zeta_{i,k}\leq\zeta_i$, and $\zeta_i$ is a given upper bound; $\beta_{i,k}$ is a Bernoulli distributed random variable to describe the deception attack satisfying the following conditions:

Prob$\{\beta_{i,k}=1\}=\bar{\beta}_{i,k}$

Prob$\{\beta_{i,k}=0\}=1-\bar{\beta}_{i,k}$ wherein, $\bar{\beta}_{i,k}\in(0,1]$ is an occurrence probability of the ith mobile robot being attacked at time k;

Step 2: designing a secure estimator for the nonlinear dynamic model of the multi-mobile robots system established in Step 1; wherein detailed steps are as follows:

Step 2a: introducing the following notations to facilitate a subsequent derivation:

$$\vec{f}(\vec{x}_{i,k}) = \vec{x}_{i,k} + \begin{bmatrix} \delta_{i,k}\cos(\theta_{i,k}) \\ \delta_{i,k}\sin(\theta_{i,k}) \\ \varsigma_{i,k} \end{bmatrix},$$

$$\vec{\Gamma} = \begin{bmatrix} 0.01 & 0 & 0 \\ 0 & 001 & 0 \\ 0 & 0 & 001 \end{bmatrix},$$

$$\vec{C}_{i,k} = \begin{bmatrix} 1 & 0 & 0 \\ 0 & 1 & 0 \end{bmatrix},$$

$$x_{i,k} = \begin{bmatrix} \vec{x}_{i,k} \\ \vec{x}_{i,k-1} \end{bmatrix},$$

$$f(x_{i,k}) = \begin{bmatrix} \vec{f}(\vec{x}_{i,k}) \\ 0_{3\times 1} \end{bmatrix},$$

$$\tilde{I} = \begin{bmatrix} 0_{3\times 3} & 0_{3\times 3} \\ I_3 & 0_{3\times 3} \end{bmatrix},$$

-continued $$B_{i,k} = \begin{bmatrix} \vec{B}_{i,k} \\ 0_{3\times 3} \end{bmatrix}$$

$$C_{i,k} = \begin{bmatrix} \vec{C}_{i,k} & \vec{0}_{2\times 3} \\ 0_{2\times 3} & \vec{C}_{i,k-1} \end{bmatrix},$$

$$v_{i,k} = \begin{bmatrix} \vec{V}_{i,k} \\ \vec{V}_{i,k-1} \end{bmatrix},$$

$$\Gamma = \begin{bmatrix} \vec{\Gamma} & 0_{3\times 3} \\ 0_{3\times 3} & 0_{3\times 3} \end{bmatrix},$$

$$E_k = \begin{bmatrix} \vec{E}_k & 0_{3\times 3} \\ 0_{3\times 3} & 0_{3\times 3} \end{bmatrix}$$

$$R_{i,k} = \begin{bmatrix} \vec{R}_{i,k} & \vec{0}_{2\times 2} \\ 0_{2\times 2} & \vec{R}_{i,k-1} \end{bmatrix},$$

$$\Upsilon_{i,k} = [(1-\beta_{i,k})\lambda_{i,k}I_2 \ (1-\beta_{i,k})(1-\lambda_{i,k})I_2]$$

wherein, $\vec{f}(\vec{x}_{i,k})$ is a nonlinear function in the multi-mobile robots system; $\vec{\Gamma}$ denotes an inner coupling matrix; $\vec{C}_{i,k}$ represents a measurement matrix of the ith mobile robot at time k; $x_{i,k}$ is an augmented state variable of $\vec{x}_{i,k}$ and $\vec{x}_{i,k-1}$; $f(x_{i,k})$ is an augmented nonlinear function; $B_{i,k}$ is an augmented noise density matrix; $C_{i,k}$ is an augmented measurement matrix; $\Gamma$ is an augmented inner coupling matrix; $\vec{E}_k$ is a nonlinear function coefficient matrix based on the multi-mobile robots system; $E_k$ is an augmented nonlinear function coefficient matrix; $\vec{R}_{i,k}$ is a covariance matrix of measurement noise $\vec{v}_{i,k}$ at time k; $\vec{R}_{i,k-1}$ is a covariance matrix of measurement noise $\vec{v}_{i,k-1}$ at time k−1; $v_{i,k}$ is augmented measurement noise with zero mean and covariance matrix $R_{i,k}$; $Y_{i,k}$ is a random matrix composed of random variables $\lambda_{i,k}$ and $\beta_{i,k}$ portraying the phenomena of the random sensor one-step delay and the deception attack; $I_3$ denotes a three-dimensional identity matrix; $I_2$ denotes a two-dimensional identity matrix;

Step 2b: based on received measurements, constructing the following estimator for the ith mobile robot in the network communication:

$$\hat{x}_{i,k+1|k} = f(\hat{x}_{i,k|k}) + \tilde{I}\hat{x}_{i,k|k} + \sum_{j=1}^{N} \bar{\alpha}_{ij,k}\Gamma\hat{x}_{j,k|k} \quad (5)$$

$$\hat{x}_{i,k+1|k+1} = \hat{x}_{i,k+1|k} + K_{i,k+1}(y_{i,k+1} - \Upsilon_{i,k+1}C_{i,k+1}\hat{x}_{i,k+1|k}) \quad (6)$$

wherein, $\hat{x}_{i,k+1|k}$ is a one-step prediction of the ith mobile robot at time k; $f(\hat{x}_{i,k|k})$ is an estimation of a nonlinear function of the ith mobile robot at time k in the multi-mobile robots system; $\hat{x}_{i,k|k}$ is a state estimation of the ith mobile robot at time k; $\hat{x}_{j,k|k}$ is a state estimation of the jth mobile robot at time k; $\hat{x}_{i,k+1|k+1}$ is a state estimation of the ith mobile robot at time k+1; $\bar{\alpha}_{ij,k}$ is an expectation of a random coupling strength $\alpha_{ij,k}$ of the ith mobile robot and the jth mobile robot at time k; $C_{i,k+1}$ is an augmented measurement matrix of the ith mobile robot at time k+1; $y_{i,k+1}$ is an actual measurement output of the ith mobile robot at time k+1; $K_{i,k+1}$ is an estimator gain matrix of the ith mobile robot at time k+1; $\Upsilon_{i,k+1} = [(1-\bar{\beta}_{i,k+1})\bar{\lambda}_{i,k+1}I_2 (1-\bar{\beta}_{i,k+1})(1-\bar{\lambda}_{i,k+1})I_2]$ is composed of an occurrence probability of the random sensor one-step delay $\bar{\lambda}_{i,k+1}$ and an occurrence probability of the deception attack $\bar{\beta}_{i,k+1}$ of the ith mobile robot at time k+1;

Step 3: calculating an upper bound on a one-step prediction error covariance matrix $\Sigma_{i,k+1|k}$ for each mobile robot;

in this step, the upper bound on the one-step prediction error covariance matrix $\Sigma_{i,k+1|k}$ for each mobile robot is calculated according to the following equation:

$$\Sigma_{i,k+1|k} = \qquad (7)$$

$$(1+\varepsilon_1+\varepsilon_2)l_k^2 tr\left\{\sum_{i,k|k}\right\}I_6 + (1+\varepsilon_1^{-1}+\varepsilon_3)(E_k+\tilde{I})\sum_{i,k|k}(E_k+\tilde{I})^T +$$

$$(1+\varepsilon_2^{-1}+\varepsilon_3^{-1})\bar{\alpha}_{i,k}\sum_{j=1}^{N}\bar{\alpha}_{ij,k}\Gamma\sum_{j,k|k} + (1+\varepsilon_4)\sum_{j=1}^{N}\hat{\alpha}_{ij,k}\Gamma\sum_{j,k|k}\Gamma^T +$$

$$(1+\varepsilon_4^{-1})\sum_{j=1}^{N}\hat{\alpha}_{ij,k}\Gamma\hat{x}_{j,k|k}\hat{x}_{j,k|k}^T\Gamma^T + B_{i,k}Q_{i,k}B_{i,k}^T$$

wherein, $\varepsilon_1$, $\varepsilon_2$, $\varepsilon_3$ and $\varepsilon_4$ are known scaling parameters; $\varepsilon_1^{-1}$, $\varepsilon_2^{-1}$, $\varepsilon_3^{-1}$ and $\varepsilon_4^{-1}$ are inverses of $\varepsilon_1$, $\varepsilon_2$, $\varepsilon_3$ and $\varepsilon_4$, respectively; $l_k$ is an upper bound of scaling coefficient of the nonlinear function in the multi-mobile robots system; $l_k^2$ is a square of the upper bound of scaling coefficient $l_k$; $\Sigma_{i,k+1|k}$ is an upper bound on an one-step prediction error covariance matrix of the ith mobile robot at time k; $\Sigma_{i,k|k}$ is an upper bound on an estimation error covariance matrix of the ith mobile robot at time k; $\Sigma_{j,k|k}$ is an upper bound on an estimation error covariance matrix of the jth mobile robot at time k; $\hat{x}_{j,k|k}^T$ is a transpose matrix of $\hat{x}_{j,k|k}$; $\Gamma^T$ is a transpose matrix of $\Gamma$; $(E_k+\tilde{I})^T$ is a transpose matrix of $$(E_k+\tilde{I}); \bar{\alpha}_{i,k} = \sum_{j=1}^{N}\bar{\alpha}_{ij,k}$$

is an intermediate variable; $B_{i,k}^T$ is a transpose matrix of $B_{i,k}$; $Q_{i,k}$ is a covariance matrix of the process noise $\bar{\omega}_{i,k}$; $tr\{\Box\}$ is a trace of a matrix; $I_6$ denotes a six-dimensional identity matrix;

Step 4: based on the upper bound on the one-step prediction error covariance matrix $\Sigma_{i,k+1|k}$ obtained in Step 3, calculating an estimator gain matrix $K_{i,k+1}$ for each mobile robot;

in this step, the estimator gain matrix $K_{i,k+1}$ for each mobile robot is calculated according to the following equation:

$$K_{i,k+1} = (1+\varepsilon_5)\Sigma_{i,k+1|k}C_{i,k+1}^T\Upsilon_{i,k+1}^T\{(1+\varepsilon_5) \\ \bar{\lambda}_{i,k+1}C_{i,k+1}\Sigma_{i,k+1|k}C_{i,k+1}^T\Upsilon_{i,k+1}^T + (1- \\ \bar{\beta}_{i,k+1})tr\{R_{i,k+1}\}I_2 + (1+\varepsilon_5^{-1})\bar{\beta}_{i,k+1}\tilde{\zeta}_i I_2 + \Upsilon_{i,k+1}(\tilde{I} - \\ \Upsilon_{i,k+1})^T \times tr\{C_{i,k+1}[(1+\varepsilon_6)\Sigma_{i,k+1|k} + \\ (1+\varepsilon_6^{-1})\hat{x}_{i,k+1|k}\hat{x}_{i,k+1|k}^T]C_{i,k+1}^T\}I_2\}^{-1} \qquad (8)$$

wherein, $\varepsilon_5$ and $\varepsilon_6$ are known scaling parameters; $\varepsilon_5^{-1}$ and $\varepsilon_6^{-1}$ are inverses of $\varepsilon_5$ and $\varepsilon_6$, respectively; $R_{i,k+1}$ is a covariance matrix of augmented process noise $v_{i,k+1}$; $\bar{\beta}_{i,k+1}$ is an occurrence probability of the ith mobile robot being attacked at time k+1; $\Upsilon_{i,k+1}^T$ is a transpose matrix of $\Upsilon_{i,k+1}$; $\tilde{I} = [I_2 \ I_2]$; a superscript "−1" indicates an inverse of a matrix;

Step 5: substituting the estimator gain matrix $K_{i,k+1}$ calculated in Step 4 into Step 2 to obtain a state estimation $\hat{x}_{i,k+1|k+1}$ at time k+1; determining whether k+1 reaches a total duration M, if k+1<M, performing Step 6, if k+1=M, ending;

Step 6: based on the estimator gain matrix $K_{i,k+1}$ calculated in Step 4, calculating an upper bound on an estimation error covariance matrix $\Sigma_{i,k+1|k+1}$; let k=k+1, and performing Step 2 until k+1=M is satisfied;

in this step, the upper bound on the estimation error covariance matrix $\Sigma_{i,k+1|k+1}$ for each mobile robot is calculated according to the following equation:

$$\Sigma_{i,k+1|k+1} = (1+\varepsilon_5)(I_6 - K_{i,k+1}\overline{Y}_{i,k+1}C_{i,k+1})\Sigma_{i,k+1|k}(I_6 - K_{i,k+1}\overline{Y}_{i,k+1}C_{i,k+1})^T + (1+\varepsilon_5^{-1})\overline{\beta}_{i,k+1}\zeta_i K_{i,k+1}K_{i,k+1}^T + K_{i,k+1}\overline{Y}_{i,k+1}(I - \overline{Y}_{i,k+1})^T \times tr\{C_{i,k+1}[(1+\varepsilon_6)\Sigma_{i,k+1|k} + (1+\varepsilon_6^{-1})\hat{x}_{i,k+1|k}\hat{x}_{i,k+1|k}^T]C_{i,k+1}^T\}K_{i,k+1}^T + (1-\overline{\beta}_{i,k+1})tr\{R_{i,k+1}\}K_{i,k+1}K_{i,k+1}^T \quad (9)$$

wherein, $\Sigma_{i,k+1|k+1}$ is an upper bound on an estimation error covariance matrix of the ith mobile robot at time k+1;

in this step, the upper bound on the estimation error covariance matrix is calculated, such that $P_{i,k+1|k+1} \leq \Sigma_{i,k+1|k+1}$ holds, where $P_{i,k+1|k+1} = E\{\tilde{x}_{i,k+1|k+1}\tilde{x}_{i,k+1|k+1}^T\}$ is an estimation error covariance matrix of the ith mobile robot at time k+1, $\tilde{x}_{i,k+1|k+1} = x_{i,k+1} - \hat{x}_{i,k+1|k+1}$ is an estimation error of the ith mobile robot at time k+1, $E\{\Box\}$ is a mathematical expectation of the random variable "$\Box$", and $\tilde{x}_{i,k+1|k+1}^T$ is a transpose of $\tilde{x}_{i,k+1|k+1}$. Due to the existence of uncertain terms in the estimation error covariance matrix, the accurate value of the estimation error covariance matrix cannot be obtained. Accordingly, an alternative approach is to find the upper bounds on the one-step prediction error covariance and estimation error covariance. Furthermore, the estimator gain matrix $K_{i,k+1}$ is determined by minimizing the trace of upper bound on the estimation error covariance matrix at time k+1.

Embodiment: the state estimation problem of the multi-mobile robots system subject to random coupling strength and random sensor one-step delay under deception attack is solved by adopting the estimation method proposed in the present invention.

In the present invention, the network communication consisting of four mobile robots is selected for simulation experiment with the following system parameters.

In the simulation experiment, the measurement matrices are set as $$\vec{C}_{1,k} = \vec{C}_{2,k} = \vec{C}_{3,k} = \vec{C}_{4,k} = \begin{bmatrix} 1 & 0 & 0 \\ 0 & 1 & 0 \end{bmatrix};$$

the inner coupling matrix is chosen as $\vec{\Gamma}$=diag{0.01, 0.01, 0.01}; diag{$\Box$} stands for the diagonal matrix; the coupling strength $\alpha_{ij,k}$ obeys the uniform distribution on the interval [0.2, 0.4]; the noise density matrices are $\vec{B}_{1,k}$=diag{0.12,0.12,0.12}, $\vec{B}_{2,k}$=diag{0.24,0.24,0.06}, $\vec{B}_{3,k}$=diag{0.1,0.1,0.08} and $\vec{B}_{1,k}$=diag{0.4,0.4,0.01}, respectively; the adjustment parameters are set as $\varepsilon_1=\varepsilon_2=\varepsilon_3=\varepsilon_4=\varepsilon_5=\varepsilon_6=0.5$; the nonlinear function is $\vec{f}(\vec{x}_{i,k}) = \vec{E}_k\vec{x}_{i,k} + \vec{f}(\vec{x}_{i,k})$, where $\vec{f}(\vec{x}_{i,k}) = [\delta_{i,k}\cos(\theta_{i,k}) \ \delta_{i,k}\sin(\theta_{i,k}) \ \zeta_{i,k}]^T$ and the coefficient matrix is $\vec{E}_k = I_3$; the upper bound of scaling coefficient of the nonlinear function is $l_k=0.5$; the deception signals are $\zeta_{1,k}$=[0.12 sin(k) 0.1]$^T$, $\zeta_{2,k}$=[0.15 sin(k) 0.1]$^T$, $\zeta_{3,k}$=[0.13 sin(k) 0.1]$^T$ and $\zeta_{4,k}$=[0.11 sin(k) 0.1]$^T$; the upper bound of the deception signal is $\zeta_i$=0.035; the occurrence probability of deception attack is given as $\overline{\beta}_{i,k}$=0.01; the occurrence probability of random sensor one-step delay is set as $\overline{\lambda}_{i,k}$=0.75; the covariance matrices of process noise are chosen as $Q_{1,k}=Q_{2,k}=Q_{3,k}=Q_{4,k}$=0.1$I_2$; $I_2$ represents a two-dimensional identity matrix; the displacement velocity and angular velocity are $\delta_{i,k}$=0.5 and $\zeta_{i,k}$=0.05, respectively; the covariance matrices of measurement noise are given as $\vec{R}_{1,k}=\vec{R}_{2,k}=\vec{R}_{3,k}=\vec{R}_{4,k}$=0.1$I_2$; the initial positions of the four robots are set as (0.5,3.3), (2.2,2.2), (3.3,4.4) and (5.5,4.4); the initial estimation satisfies $\vec{\hat{x}}_{i,0|0} = \vec{x}_{i,0}$; the initial values of estimation error covariance matrix are given as $\Sigma_{1,0|0}=\Sigma_{2,0|0}=\Sigma_{3,0|0}=\Sigma_{4,0|0}$=2$I_6$; $I_6$ represents a six-dimensional identity matrix.

The mean square error is employed to evaluate estimation algorithm performance in the present invention. log(MSE$_k$) is the logarithm of the average of the mean square error of the motion trajectories of four mobile robots, i.e., $$\log(MSE_k) = \log\left(\frac{1}{4}\sum_{i=1}^{4} MSE_{i,k}\right);$$

log($\Box$) denotes a logarithm of "$\Box$"; MSE$_{i,k}$ denotes the mean square error of the ith mobile robot at time k; the mean square errors of four mobile robots at time k are defined as:

$$MSE_{1,k} = \frac{1}{m}\sum_{r=1}^{m}\left(\vec{x}_{1,k}^{(r)} - \hat{\vec{x}}_{1,k}^{(r)}\right)^T\left(\vec{x}_{1,k}^{(r)} - \hat{\vec{x}}_{1,k}^{(r)}\right)$$

$$MSE_{2,k} = \frac{1}{m}\sum_{r=1}^{m}\left(\vec{x}_{2,k}^{(r)} - \hat{\vec{x}}_{2,k}^{(r)}\right)^T\left(\vec{x}_{2,k}^{(r)} - \hat{\vec{x}}_{2,k}^{(r)}\right)$$

$$MSE_{3,k} = \frac{1}{m}\sum_{r=1}^{m}\left(\vec{x}_{3,k}^{(r)} - \hat{\vec{x}}_{3,k}^{(r)}\right)^T\left(\vec{x}_{3,k}^{(r)} - \hat{\vec{x}}_{3,k}^{(r)}\right)$$

$$MSE_{4,k} = \frac{1}{m}\sum_{r=1}^{m}\left(\vec{x}_{4,k}^{(r)} - \hat{\vec{x}}_{4,k}^{(r)}\right)^T\left(\vec{x}_{4,k}^{(r)} - \hat{\vec{x}}_{4,k}^{(r)}\right)$$

wherein, m=300 represents a number of Monte Carlo experiments; $\vec{x}_{i,k}^{(r)}$ and $\hat{\vec{x}}_{i,k}^{(r)}$ stand for the actual state and the estimation of $\vec{x}_{i,k}^{(r)}$ in the rth run, respectively. The average mean square error is introduced to further evaluate the effect of attack probability on estimation performance, which is defined as $$MSE_k' = \sum_{k=1}^{M}\log(MSE_k)/M; M = 115$$

is a total duration of network operation in the present invention.

Figure 2:
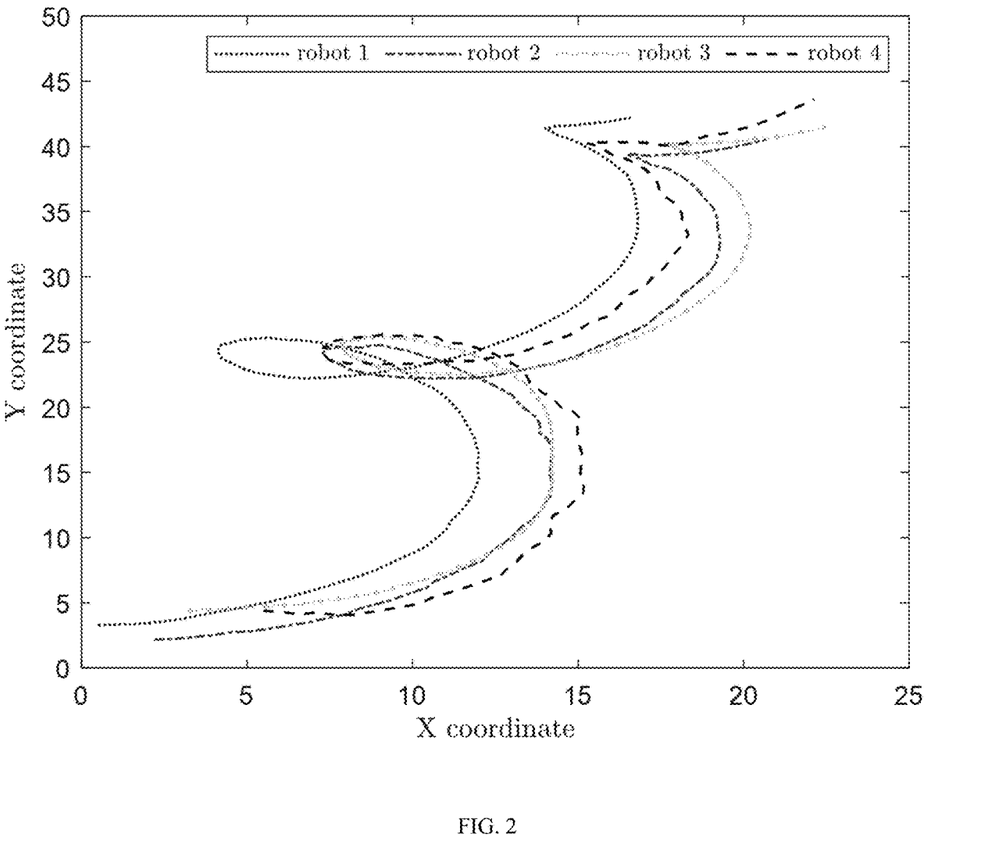
FIG. 2 shows the actual trajectories of the four mobile robots in the multi-mobile robots system.
Figure 3:
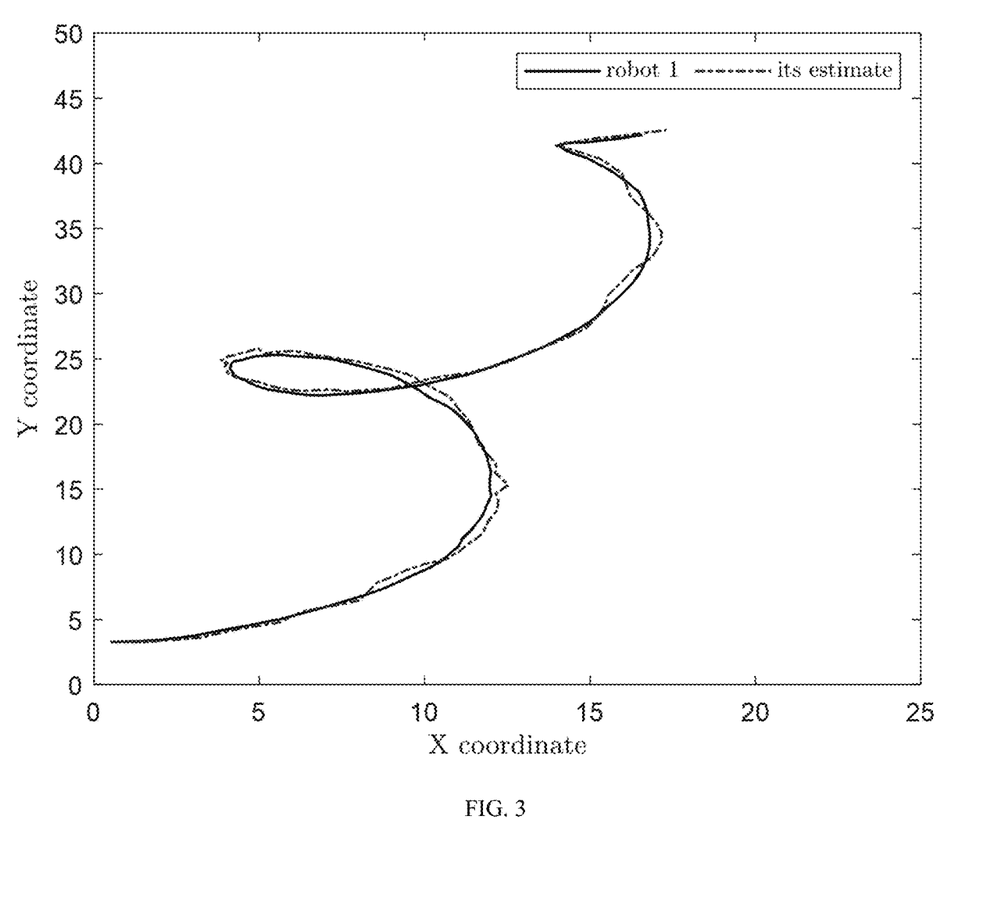
FIG. 3 shows the actual and tracking trajectories of the robot 1 in the multi-mobile robots system.
Figure 4:
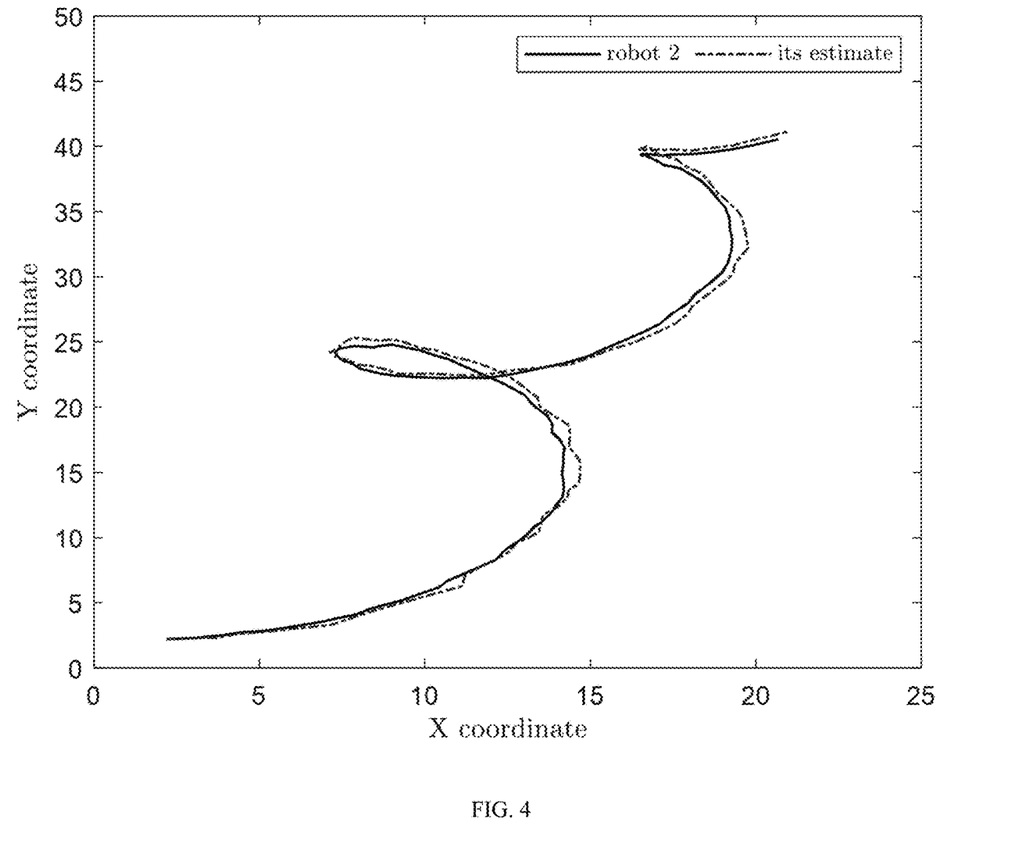
FIG. 4 shows the actual and tracking trajectories of the robot 2 in the multi-mobile robots system.
Figure 5:
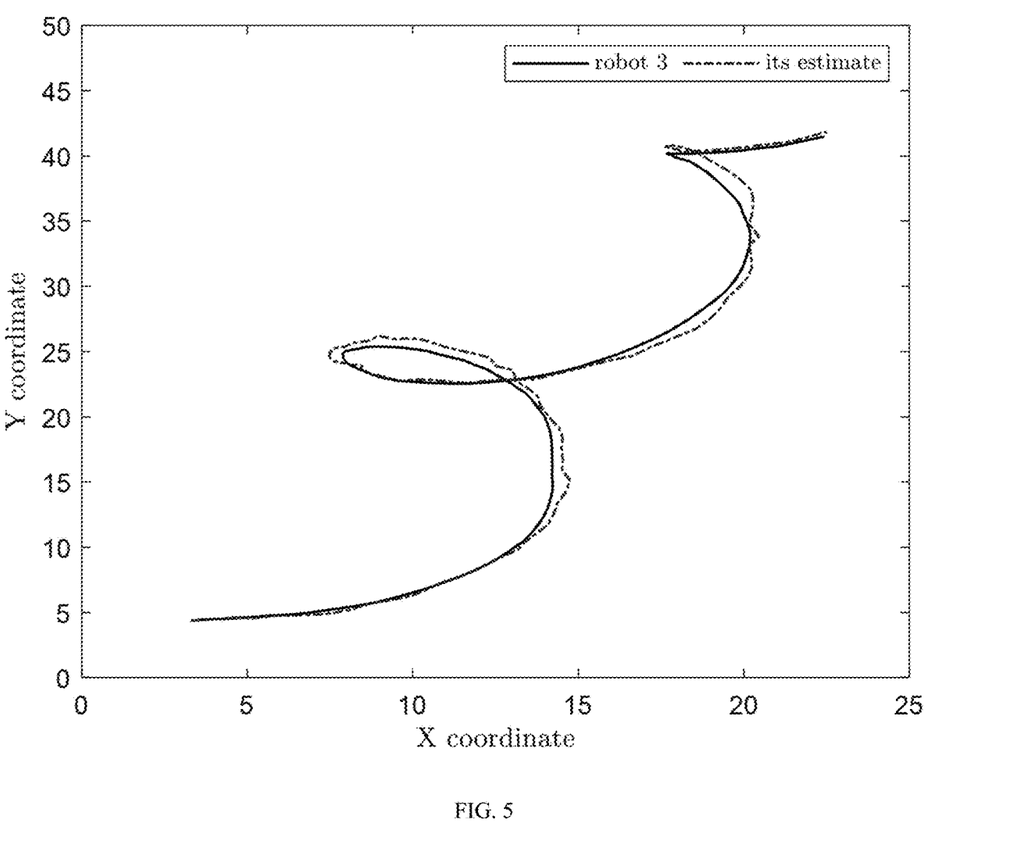
FIG. 5 shows the actual and tracking trajectories of the robot 3 in the multi-mobile robots system.
Figure 6:
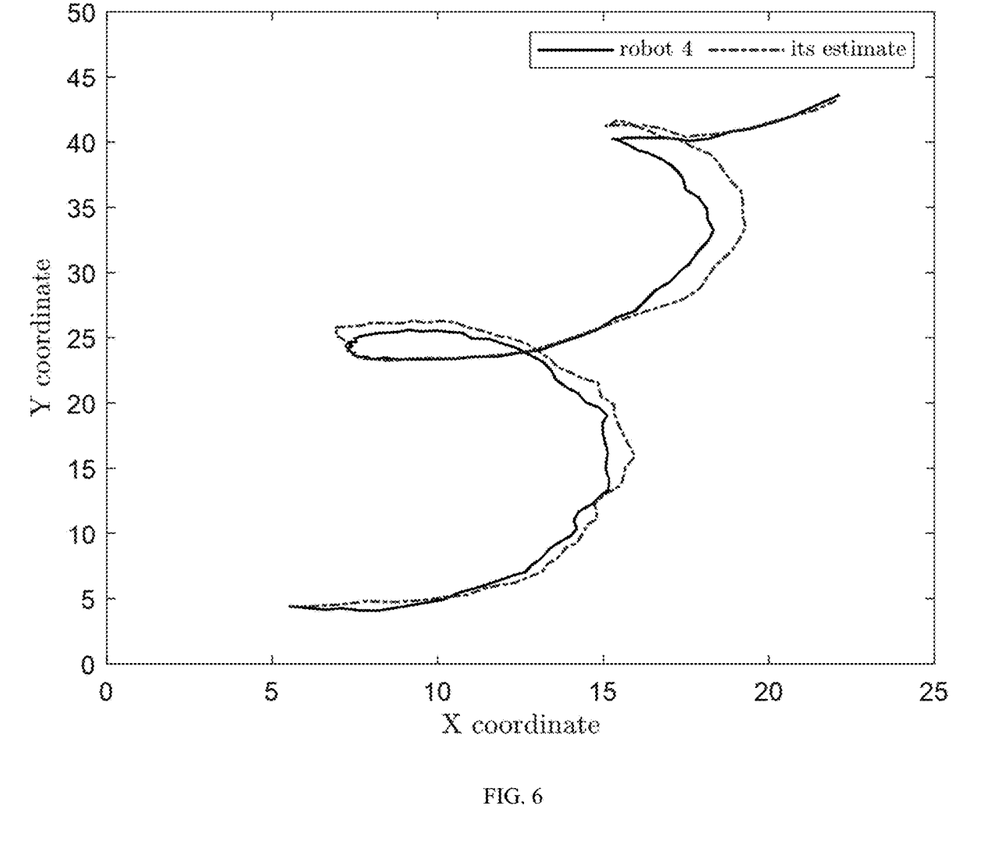
FIG. 6 shows the actual and tracking trajectories of the robot 4 in the multi-mobile robots system.
Figure 7:
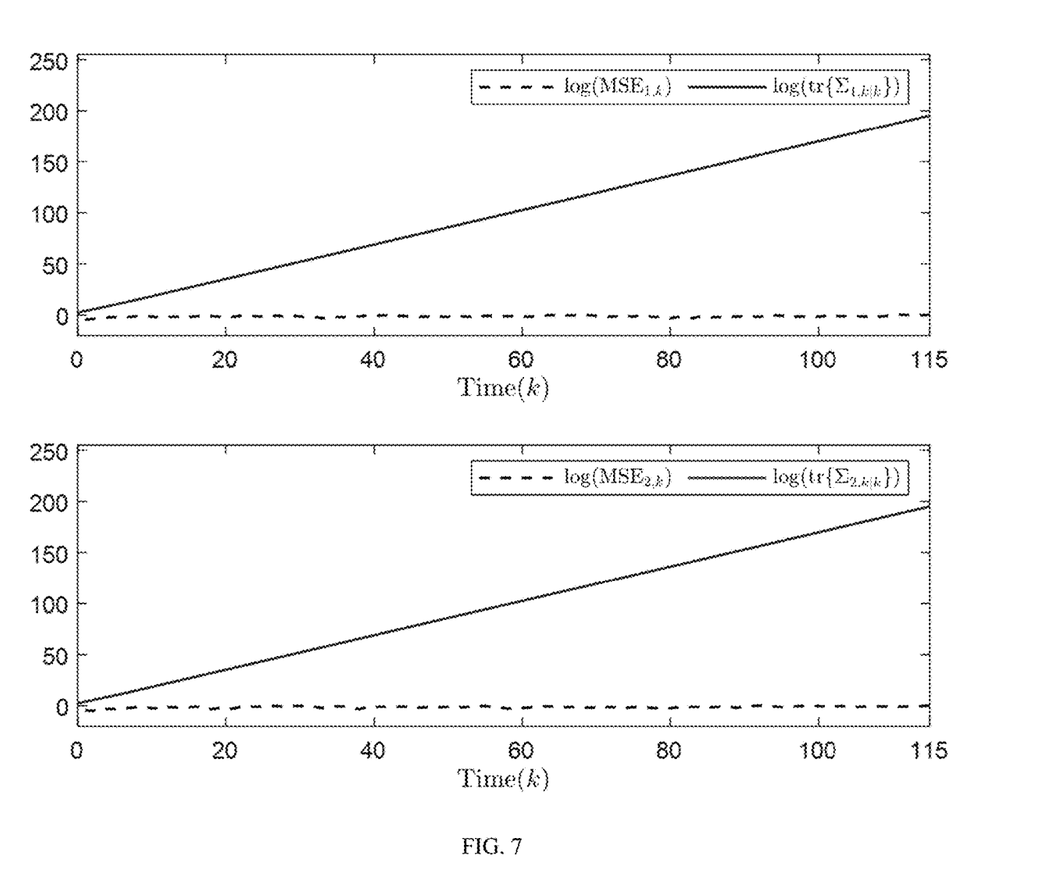
FIG. 7 shows the logarithm of tr$\{\Sigma_{i,k|k}\}$ and the mean square error of the robot 1 and robot 2.
Figure 8:
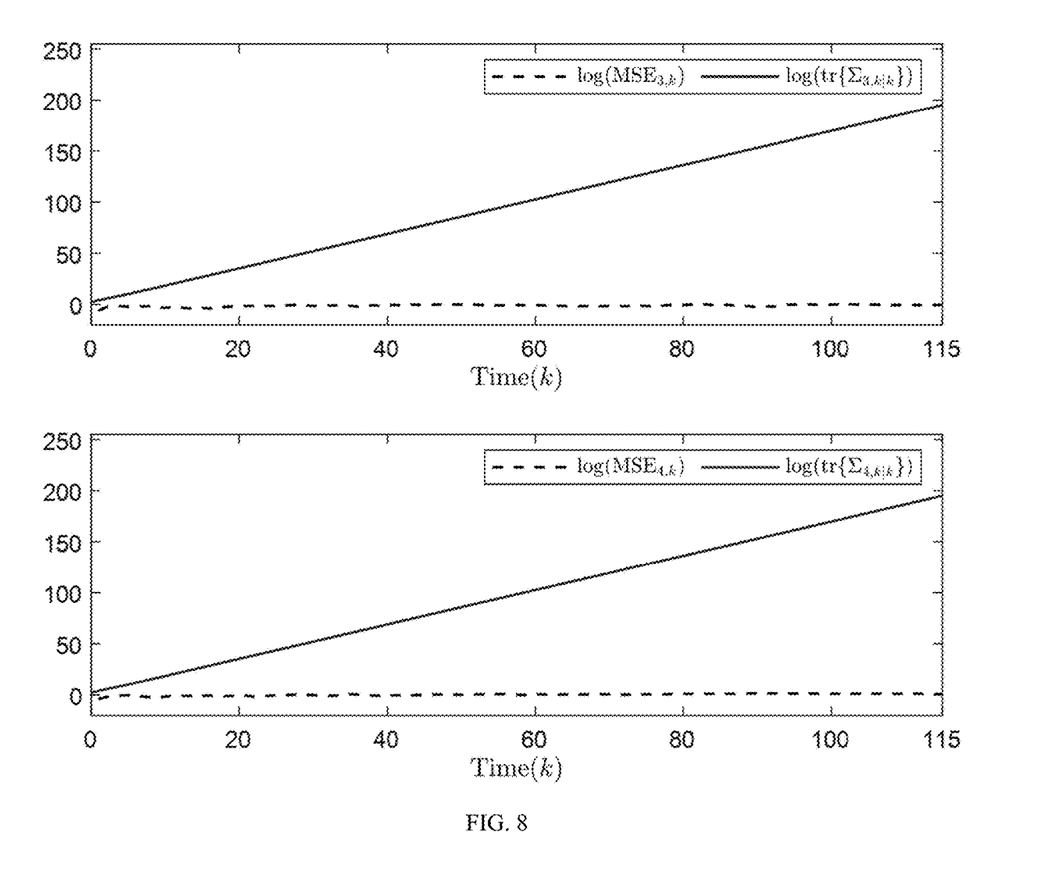
FIG. 8 shows the logarithm of tr$\{\Sigma_{i,k|k}\}$ and the mean square error of the robot 3 and robot 4.

Multi-Mobile Robots Tracking Effects:

The actual trajectories of the four mobile robots are given in FIG. 2. The actual motion and tracking trajectories of the four mobile robots under $\overline{\beta}_{i,k}$=0.01 are given in FIGS. 3-6, respectively. As can be seen from the figures, the secure localization method proposed by the present invention can effectively track the trajectories of the mobile robots for the multi-mobile robots system with random coupling strength and random sensor one-step delay under deception attack. FIG. 7 and FIG. 8 plot the logarithm of tr$\{\Sigma_{i,k|k}\}$ and $MSE_{i,k}$ of the four mobile robots, which verifies the effectiveness of the proposed estimation method in the present invention.

Figure 9:
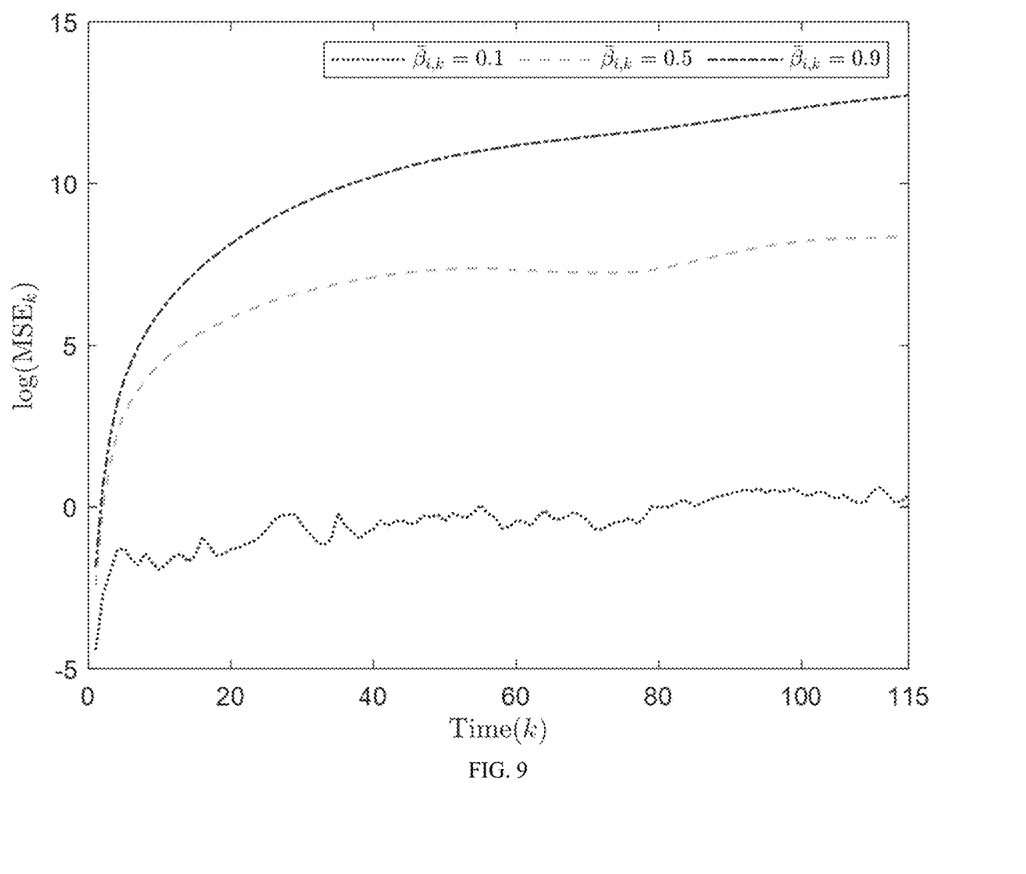
FIG. 9 shows the comparison of log(MSE$_k$) for mobile robots under different attack probabilities $\bar{\beta}_{i,k}$.

FIG. 9 shows the average of mean square error of four mobile robots under different attack probabilities, which can be seen that as the attack probability increases, the mean square error also increases. That is to say, the tracking performance of the security localization method for the multi-mobile robots system deteriorates as the attack probability $\bar{\beta}_{i,k}$ increases. Furthermore, when the deception attack probabilities $\bar{\beta}_{i,k}$ are 0.9, 0.5 and 0.1, the average mean square errors of the four mobile robots are 0.1091, 0.0700 and 0.0286, i.e., the values of $MSE'_k$ are 0.1091, 0.0700 and 0.0286, respectively. This indicates that when the deception attack probability changes from 0.9 to 0.5, the average mean square error decreases by about 36%; when the deception attack probability changes from 0.5 to 0.1, the average mean square error decreases by about 10%.

In summary, the network communication-based secure localization method for multi-mobile robots proposed in the present invention can effectively estimate the target state in spite of simultaneously considering random sensor one-step delay and deception attack.

Finally, it should be noted that the above embodiment is only the description of the technical solution of the present invention and is not limited to the scope of protection of the present invention. Although the present invention is described in detail in conjunction with the above embodiment, those having ordinary skill in the art should understand that those having ordinary skill, after reading the description of the present invention, can still make changes, modifications or equivalent replacements in the embodiment, and such changes, modifications and equivalent replacements shall fall within the scope of protection of the claims.

What is claimed is:

1. A secure localization method for multi-mobile robots based on network communication, comprising the following steps:

Step 1: establishing a nonlinear dynamic model of a multi-mobile robots system based on network communication; wherein Step 1a: developing the following nonlinear dynamic model of the multi-mobile robots system:

$$\vec{x}_{i,k+1} = \vec{x}_{i,k} + \begin{bmatrix} \delta_{i,k}\cos(\theta_{i,k}) \\ \delta_{i,k}\sin(\theta_{i,k}) \\ \varsigma_{i,k} \end{bmatrix} + \sum_{j=1}^{N}\alpha_{ij,k}\begin{bmatrix} 0.01 & 0 & 0 \\ 0 & 0.01 & 0 \\ 0 & 0 & 0.01 \end{bmatrix}\vec{x}_{j,k} + \vec{B}_{i,k}\bar{\omega}_{i,k} \quad (1)$$

$$\vec{z}_{i,k} = \begin{bmatrix} 1 & 0 & 0 \\ 0 & 1 & 0 \end{bmatrix}\vec{x}_{i,k} + \vec{V}_{i,k} \quad (2)$$

$$z_{i,k} = \lambda_{i,k}\vec{z}_{i,k} + (1-\lambda_{i,k})\vec{z}_{i,k-1} \quad (3)$$

wherein, $\vec{x}_{i,k}=[u_{i,k}\ \eta_{i,k}\ \theta_{i,k}]^T$, a superscript "T" represents a transpose of a matrix; i is a label of a mobile robot and represents an ith mobile robot, $i=1, 2, \ldots, N$, N is a number of mobile robots; $(u_{i,k}, \eta_{i,k})$ denotes position information of the ith mobile robot at time k in Cartesian coordinates, $\theta_{i,k}$ represents direction information of the ith mobile robot at time k in Cartesian coordinates; $\vec{x}_{i,k+1}=[u_{i,k+1}\ \eta_{i,k+1}\ \theta_{i,k+1}]^T$, $(u_{i,k+1}, \eta_{i,k+1})$ denotes position information of the ith mobile robot at time k+1 in Cartesian coordinates, $\theta_{i,k+1}$ represents direction information of the ith mobile robot at time k+1 in Cartesian coordinates; $\delta_{i,k}$ and $\varsigma_{i,k}$ denote a displacement velocity and an angular velocity of the ith mobile robot at time k, respectively; sin($\Im$) and cos($\Im$) represent a sine function and a cosine function of $\Im$, respectively; $\vec{B}_{i,k}$ is a system noise density matrix at time k; "$\Sigma$" is a summation symbol; $\alpha_{ij,k}$ is a coupling strength of an ith mobile robot and a jth mobile robot at time k; $\vec{x}_{j,k}=[u_{j,k}\ \eta_{j,k}\ \theta_{j,k}]^T$, $(u_{j,k}, \eta_{j,k})$ denotes position information of the jth mobile robot at time k in Cartesian coordinates, $\theta_{j,k}$ represents direction information of the jth mobile robot at time k in Cartesian coordinates; $\vec{z}_{i,k}$ is a measurement output of the ith mobile robot at time k in the multi-mobile robots system; $\vec{z}_{i,k-1}$ is a measurement output of the ith mobile robot at time k−1; $\bar{\omega}_{i,k}$ is process noise in the multi-mobile robots system; $\vec{v}_{i,k}$ is measurement noise in the multi-mobile robots system; $z_{i,k}$ is a measurement output of the ith mobile robot suffering from a random sensor one-step delay at time k; $\lambda_{i,k}$ is a Bernoulli distributed random variable to characterize a phenomenon of the random sensor one-step delay;

Step 1b: when data is transmitted in an opening-up and sharing network communication, a deception attack affects a measurement signal, wherein an actual measurement received by an estimator is represented as follows:

$$y_{i,k}=z_{i,k}+\beta_{i,k}\tilde{n}_{i,k} \quad (4)$$

wherein, $y_{i,k}$ is an actual measurement output of the ith mobile robot at time k; $\tilde{n}_{i,k}=-z_{i,k}+\zeta_{i,k}$ represents a deception signal, $\zeta_{i,k}$ is a bounded attack signal satisfying a condition $\zeta_{i,k}^T\zeta_{i,k}\leq\bar{\zeta}_i$, and $\bar{\zeta}_i$ is a given upper bound; $\beta_{i,k}$ is a Bernoulli distributed random variable to describe the deception attack;

Step 2: designing a secure estimator for the nonlinear dynamic model of the multi-mobile robots system established in Step 1; wherein detailed steps are as follows:

Step 2a: introducing the following notations to facilitate a subsequent derivation:

$$\vec{f}(\vec{x}_{i,k}) = \vec{x}_{i,k} + \begin{bmatrix} \delta_{i,k}\cos(\theta_{i,k}) \\ \delta_{i,k}\sin(\theta_{i,k}) \\ \varsigma_{i,k} \end{bmatrix},$$

$$\vec{\Gamma} = \begin{bmatrix} 0.01 & 0 & 0 \\ 0 & 0.01 & 0 \\ 0 & 0 & 0.01 \end{bmatrix},$$

$$\vec{C}_{i,k} = \begin{bmatrix} 1 & 0 & 0 \\ 0 & 1 & 0 \end{bmatrix},$$

$$x_{i,k} = \begin{bmatrix} \vec{x}_{i,k} \\ \vec{x}_{i,k-1} \end{bmatrix},$$

$$f(x_{i,k}) = \begin{bmatrix} \vec{f}(\vec{x}_{i,k}) \\ 0_{3\times 1} \end{bmatrix},$$

$$I = \begin{bmatrix} 0_{3\times 3} & 0_{3\times 3} \\ I_3 & 0_{3\times 3} \end{bmatrix},$$

$$B_{i,k} = \begin{bmatrix} \vec{B}_{i,k} \\ 0_{3\times 3} \end{bmatrix}$$

-continued $$C_{i,k} = \begin{bmatrix} \vec{C}_{i,k} & 0_{2\times 3} \\ 0_{2\times 3} & \vec{C}_{i,k-1} \end{bmatrix},$$

$$v_{i,k} = \begin{bmatrix} \vec{V}_{i,k} \\ \vec{V}_{i,k-1} \end{bmatrix},$$

$$\Gamma = \begin{bmatrix} \vec{\Gamma} & 0_{3\times 3} \\ 0_{3\times 3} & 0_{3\times 3} \end{bmatrix},$$

$$E_k = \begin{bmatrix} \vec{E}_k & 0_{3\times 3} \\ 0_{3\times 3} & 0_{3\times 3} \end{bmatrix}$$

$$R_{i,k} = \begin{bmatrix} \vec{R}_{i,k} & 0_{2\times 2} \\ 0_{2\times 2} & \vec{R}_{i,k-1} \end{bmatrix},$$

$$\Upsilon_{i,k} = [(1-\beta_{i,k})\lambda_{i,k}I_2 \ (1-\beta_{i,k})(1-\lambda_{i,k})I_2]$$

wherein, $\vec{f}(\vec{x}_{i,k})$ is a nonlinear function in the multi-mobile robots system; $\vec{\Gamma}$ denotes an inner coupling matrix; $\vec{C}_{i,k}$ represents a measurement matrix of the ith mobile robot at time k; $x_{i,k}$ is an augmented state variable of $\vec{x}_{i,k}$ and $\vec{x}_{i,k-1}$; $f(x_{i,k})$ is an augmented nonlinear function; $B_{i,k}$ is an augmented noise density matrix; $C_{i,k}$ is an augmented measurement matrix; $\Gamma$ is an augmented inner coupling matrix; $\vec{E}_k$ is a nonlinear function coefficient matrix based on the multi-mobile robots system; $E_k$ is an augmented nonlinear function coefficient matrix; $\vec{R}_{i,k}$ is a covariance matrix of measurement noise $\vec{v}_{i,k}$ at time k; $\vec{R}_{i,k-1}$ is a covariance matrix of measurement noise $\vec{v}_{i,k-1}$ at time k−1; $v_{i,k}$ is augmented measurement noise with zero mean and covariance matrix $R_{i,k}$; $\Upsilon_{i,k}$ is a random matrix composed of random variables $\lambda_{i,k}$ and $\beta_{i,k}$ portraying the phenomena of the random sensor one-step delay and the deception attack; $I_3$ denotes a three-dimensional identity matrix; $I_2$ denotes a two-dimensional identity matrix;

Step 2b: based on received measurements, constructing the following estimator for the ith mobile robot in the network communication:

$$\hat{x}_{i,k+1|k} = f(\hat{x}_{i,k|k}) + \tilde{I}\hat{x}_{i,k|k} + \sum_{j=1}^{N} \bar{\alpha}_{ij,k}\Gamma \hat{x}_{j,k|k} \quad (5)$$

$$\hat{x}_{i,k+1|k+1} = \hat{x}_{i,k+1|k} + K_{i,k+1}(y_{i,k+1} - \overline{\Upsilon}_{i,k+1}C_{i,k+1}\hat{x}_{i,k+1|k}) \quad (6)$$

wherein, $\hat{x}_{i,k+1|k}$ is a one-step prediction of the ith mobile robot at time k; $f(\hat{x}_{i,k|k})$ is an estimation of a nonlinear function of the ith mobile robot at time k in the multi-mobile robots system; $\hat{x}_{i,k|k}$ is a state estimation of the ith mobile robot at time k; $\hat{x}_{j,k|k}$ is a state estimation of the jth mobile robot at time k; $\hat{x}_{i,k+1|k+1}$ is a state estimation of the ith mobile robot at time k+1; $\bar{\alpha}_{ij,k}$ is an expectation of a random coupling strength $\alpha_{ij,k}$ of the ith mobile robot and the jth mobile robot at time k; $C_{i,k+1}$ is an augmented measurement matrix of the ith mobile robot at time k+1; $y_{i,k+1}$ is an actual measurement output of the ith mobile robot at time k+1; $K_{i,k+1}$ is an estimator gain matrix of the ith mobile robot at time k+1;

$\overline{\Upsilon}_{i,k+1} = [(1-\bar{\beta}_{i,k+1})\bar{\lambda}_{i,k+1}I_2(1-\bar{\beta}_{i,k+1})(1-\bar{\lambda}_{i,k+1})I_2]$ is composed of an occurrence probability of the random sensor one-step delay $\bar{\lambda}_{i,k+1}$ and an occurrence probability of the deception attack $\bar{\beta}_{i,k+1}$ of the ith mobile robot at time k+1;

Step 3: calculating an upper bound on a one-step prediction error covariance matrix $\Sigma_{i,k+1|k}$ for each mobile robot;

in this step, the upper bound on the one-step prediction error covariance matrix $\Sigma_{i,k+1|k}$ for each mobile robot is calculated according to the following equation:

$$\Sigma_{i,k+1|k} = \quad (7)$$

$$(1+\varepsilon_1+\varepsilon_2)\ell_k^2 tr\left\{\sum_{i,k|k}\right\}I_6 + (1+\varepsilon_1^{-1}+\varepsilon_3)(E_k+\tilde{I})\sum_{i,k|k}(E_k+\tilde{I})^T +$$

$$(1+\varepsilon_2^{-1}+\varepsilon_3^{-1})\bar{\alpha}_{i,k}\sum_{j=1}^{N}\bar{\alpha}_{ij,k}\Gamma\sum_{j,k|k} + (1+\varepsilon_4)\sum_{j=1}^{N}\hat{\alpha}_{ij,k}\Gamma\sum_{j,k|k}\Gamma^T +$$

$$(1+\varepsilon_4^{-1})\sum_{j=1}^{N}\hat{\alpha}_{ij,k}\Gamma\hat{x}_{j,k|k}\hat{x}_{j,k|k}^T\Gamma^T + B_{i,k}Q_{i,k}B_{i,k}^T$$

wherein, $\varepsilon_1$, $\varepsilon_2$, $\varepsilon_3$ and $\varepsilon_4$ are known scaling parameters; $\varepsilon_1^{-1}$, $\varepsilon_2^{-1}$, $\varepsilon_3^{-1}$ and $\varepsilon_4^{-1}$ are inverses of $\varepsilon_1$, $\varepsilon_2$, $\varepsilon_3$ and $\varepsilon_4$, respectively; $l_k$ is an upper bound of scaling coefficient of the nonlinear function in the multi-mobile robots system; $l_k^2$ is a square of the upper bound of scaling coefficient $l_k$; $\Sigma_{i,k+1|k}$ is an upper bound on an one-step prediction error covariance matrix of the ith mobile robot at time k; $\Sigma_{i,k|k}$ is an upper bound on an estimation error covariance matrix of the ith mobile robot at time k; $\Sigma_{j,k|k}$ is an upper bound on an estimation error covariance matrix of the jth mobile robot at time k; $\hat{x}_{j,k|k}^T$ is a transpose matrix of $\hat{x}_{j,k|k}$; $\Gamma^T$ is a transpose matrix of $\Gamma$; $(E_k+\tilde{I})^T$ is a transpose matrix of $$(E_k+\tilde{I}); \bar{\alpha}_{i,k} = \sum_{j=1}^{N}\bar{\alpha}_{ij,k}$$

is an intermediate variable; $\hat{\alpha}_{ij,k}$ is a variance of the random coupling strength $\alpha_{ij,k}$ of the ith mobile robot and the jth mobile robot at time k; $B_{i,k}^T$ is a transpose matrix of $B_{i,k}$; $Q_{i,k}$ is a covariance matrix of the process noise $\bar{\omega}_{i,k}$; $tr\{\Box\}$ is a trace of a matrix; $I_6$ denotes a six-dimensional identity matrix;

Step 4: based on the upper bound on the one-step prediction error covariance matrix $\Sigma_{i,k+1|k}$ obtained in Step 3, calculating an estimator gain matrix $K_{i,k+1}$ for each mobile robot;

in this step, the estimator gain matrix $K_{i,k+1}$ for each mobile robot is calculated according to the following equation:

$$K_{i,k+1} = (1+\varepsilon_5)\Sigma_{i,k+1|k}C_{i,k+1}^T\overline{\Upsilon}_{i,k+1}^T\{(1+\varepsilon_5)$$
$$\overline{\Upsilon}_{i,k+1}C_{i,k+1}\Sigma_{i,k+1|k}C_{i,k+1}^T\overline{\Upsilon}_{i,k+1}^T + (1-$$
$$\bar{\beta}_{i,k+1})tr\{R_{i,k+1}\}I_2 + (1+\varepsilon_5^{-1})\bar{\beta}_{i,k+1}\bar{\zeta}_{i}I_2 + \overline{\Upsilon}_{i,k+1}(\tilde{I}-$$
$$\overline{\Upsilon}_{i,k+1})^T \times tr\{C_{i,k+1}[(1+\varepsilon_6)\Sigma_{i,k+1|k} + (1+\varepsilon_6^{-1})\hat{x}_{i,k+1|k}\hat{x}_{i,k+1|k}^T]$$
$$C_{i,k+1}^T\}I_2\}^{-1} \quad (8)$$

wherein, $\varepsilon_5$ and $\varepsilon_6$ are known scaling parameters; $\varepsilon_5^{-1}$ and $\varepsilon_6^{-1}$ are inverses of $\varepsilon_5$ and $\varepsilon_6$, respectively; $R_{i,k+1}$ is a covariance matrix of augmented process noise $v_{i,k+1}$; $\bar{\beta}_{i,k+1}$ is an occurrence probability of the ith mobile robot being attacked at time k+1; $\overline{\Upsilon}_{i,k+1}^T$ is a transpose matrix of $\overline{Y}_{i,k+1}$; $I=[I_2\ I_2]$; a superscript "−1" indicates an inverse of a matrix;

Step 5: substituting the estimator gain matrix $K_{i,k+1}$ calculated in Step 4 into Step 2 to obtain a state estimation $\hat{x}_{i,k+1|k+1}$ at time k+1; determining whether k+1 reaches a total duration M, if k+1<M, performing Step 6, if k+1=M, ending;

Step 6: based on the estimator gain matrix $K_{i,k+1}$ calculated in Step 4, calculating an upper bound on an estimation error covariance matrix $\Sigma_{i,k+1|k+1}$; let k=k+1, and performing Step 2 until k+1=M is satisfied;

in this step, the upper bound on the estimation error covariance matrix $\Sigma_{i,k+1|k+1}$ for each mobile robot is calculated according to the following equation:

$$\Sigma_{i,k+1|k+1}=(1+\varepsilon_5)(I_6-K_{i,k+1}\overline{Y}_{i,k+1}C_{i,k+1})\Sigma_{i,k+1|k}(I_6-K_{i,k+1}\overline{Y}_{i,k+1}C_{i,k+1})^T+(1+\varepsilon_5^{-1})\overline{\beta}_{i,k+1}\overline{\zeta}_j K_{i,k+1}K_{i,k+1}^T+K_{i,k+1}\overline{Y}_{i,k+1}(I-\overline{Y}_{i,k+1})^T\times tr\{C_{i,k+1}[(1+\varepsilon_6)\Sigma_{i,k+1|k}+(1+\varepsilon_6^{-1})\hat{x}_{i,k+1|k}\hat{x}_{i,k+1|k}^T]C_{i,k+1}^T\}K_{i,k+1}^T+(1-\overline{\beta}_{i,k+1})tr\{R_{i,k+1}\}K_{i,k+1}K_{i,k+1}^T \quad (9)$$

wherein, $\Sigma_{i,k+1|k+1}$ is an upper bound on an estimation error covariance matrix of the ith mobile robot at time k+1; and Step 7: estimating a target state of the multi-mobile robots when simultaneously considering the random sensor one-step delay and the deception attack, wherein when a deception attack probability changes from 0.9 to 0.5, an average mean square error decreases by about 36%; when the deception attack probability changes from 0.5 to 0.1, the average mean square error decreases by about 10%, thus improving the accuracy of the estimation performance for estimation analysis.

2. The secure localization method according to claim 1, wherein the coupling strength $\alpha_{ij,k}$ is a random variable on an interval $[c_{ij,k}, d_{ij,k}]$ satisfying $\hat{E}\{\alpha_{ij,k}\}=\overline{\alpha}_{ij,k}$ and $E\{(\alpha_{ij,k}-\overline{\alpha}_{ij,k})^2\}\sqcap E\{\alpha_{ij,k}^2\}=\alpha_{ij,k}$ with $0\leq c_{ij,k}\leq d_{ij,k}\leq 1$ being known constants, $E\{\sqcup\}$ is a mathematical expectation of the random variable "⊔".

3. The secure localization method according to claim 1, wherein $\lambda_{i,k}$ and $\beta_{i,k}$ satisfy the following conditions:

Prob$\{\lambda_{i,k}=1\}=\overline{\lambda}_{i,k}$

Prob$\{\lambda_{i,k}=0\}=1-\overline{\lambda}_{i,k}$ wherein, $\overline{\lambda}_{i,k}\in(0,1]$ is an occurrence probability of the ith mobile robot suffering from the random sensor one-step delay at time k: Prob $\{\sqsubset\}$ is a probability of event " ⊔ ";

Prob$\{\beta_{i,k}=1\}=\overline{\beta}_{i,k}$

Prob$\{\beta_{i,k}=0\}=1-\overline{\beta}_{i,k}$ wherein, $\overline{\beta}_{i,k}\in(0,1]$ is an occurrence probability of the ith mobile robot being attacked at time k.

4. The secure localization method according to claim 1, wherein the Step 6, the upper bound on the estimation error covariance matrix is calculated, such that $P_{i,k+1|k+1}\leq\Sigma_{i,k+1|k+1}$ holds, where $P_{i,k+1|k+1}=E\{\tilde{x}_{i,k+1|k+1}\tilde{x}_{i,k+1|k+1}^T\}$ is an estimation error covariance matrix of the ith mobile robot at time k+1, $\tilde{x}_{i,k+1|k+1}=x_{i,k+1}-\hat{x}_{i,k+1|k+1}$ is an estimation error of the ith mobile robot at time k+1, $E\{\sqcup\}$ is a mathematical expectation of the random variable "⊔" and $\tilde{x}_{i,k+1|k+1}^T$ is a transpose of $\tilde{x}_{i,k+1|k+1}$.

* * * * *